United States Patent
Tsuchiya

(10) Patent No.: US 6,965,421 B2
(45) Date of Patent: Nov. 15, 2005

(54) LIQUID CRYSTAL DEVICE AND ELECTRONIC EQUIPMENT THEREWITH

(75) Inventor: Yutaka Tsuchiya, Hara-Mura (JP)

(73) Assignee: Seiko Epson Corporation, Tokyo (JP)

( * ) Notice: Subject to any disclaimer, the term of this patent is extended or adjusted under 35 U.S.C. 154(b) by 49 days.

(21) Appl. No.: 10/639,493

(22) Filed: Aug. 13, 2003

(65) Prior Publication Data

US 2005/0078247 A1    Apr. 14, 2005

(30) Foreign Application Priority Data

Aug. 14, 2002 (JP) .............................. 2002-236377

(51) Int. Cl.$^7$ .......................................... G02F 1/1337
(52) U.S. Cl. .................... 349/125; 349/123; 349/124; 349/130; 349/160
(58) Field of Search .............................. 349/123, 124, 349/130, 160, 125

(56) References Cited

U.S. PATENT DOCUMENTS

| | | | | |
|---|---|---|---|---|
| 5,438,421 A | * | 8/1995 | Sugawara et al. | ........... 349/123 |
| 5,625,474 A | * | 4/1997 | Aomori et al. | ............... 349/79 |
| 5,725,915 A | * | 3/1998 | Ishitaka et al. | ............. 428/1.31 |
| 6,069,019 A | * | 5/2000 | Ishii et al. | ...................... 438/30 |
| 6,327,016 B1 | * | 12/2001 | Yamada et al. | ............. 349/160 |
| 6,466,296 B1 | * | 10/2002 | Yamada et al. | ............. 349/349 |

FOREIGN PATENT DOCUMENTS

| | | |
|---|---|---|
| JP | 52-108835 | 9/1977 |
| JP | A 60-60624 | 4/1985 |
| JP | A 61-128225 | 6/1986 |
| JP | A 1-238619 | 9/1989 |
| JP | A 8-114804 | 5/1996 |
| JP | A 9-152612 | 6/1997 |
| JP | A 2000-155318 | 6/2000 |

* cited by examiner

Primary Examiner—Dung T. Nguyen
Assistant Examiner—Michael H Caley
(74) Attorney, Agent, or Firm—Oliff & Berridge, PLC

(57) ABSTRACT

A liquid crystal device, in which an orientation film does not deteriorate over time, contrast decreases slightly during longterm use, the axial orientation in the horizontal direction is high, and superior display quality is exhibited, and electronic equipment therewith are disclosed. A liquid crystal light valve employing a liquid crystal device is also disclosed, in which a pair of substrates facing each other; a liquid crystal layer interposed between the pair of substrates; an electrode formed on each of the substrates; and an orientation film formed on the surface of each of the electrodes are provided on the surface 15 of the substrate body 10A, plural grooves 16 are formed in parallel, in each of the grooves, concave-convex portions 10a are formed, which periodically vary along an axial orientation direction Ax of the liquid crystal and have a sawtoothed cross-sectional form along the direction Ax, and between an opening 16a of the groove 16 and each of the top parts 18 of the concave-convex portions 10a, a height difference G is provided.

14 Claims, 12 Drawing Sheets

LIQUID CRYSTAL DEVICE AND ELECTRONIC EQUIPMENT THEREWITH

BACKGROUND OF THE INVENTION

1. Field of the Invention

The present invention relates to a liquid crystal device and to electronic equipment, and in particular, relates to a liquid crystal device in which only slight deterioration of an orientation film over time is exhibited, contrast slightly decreases even in the case of longterm use, and display quality is improved by increasing the axial orientation in a horizontal direction, and relates to electronic equipment equipped with the liquid crystal device described above.

2. Description of Related Art

A liquid crystal device for use as a light modulating device to be mounted on a projection type display device such as a liquid crystal projector, or a direct viewing type display device to be mounted on a mobile phone, or the like, mainly comprises a pair of substrates which are arranged to face each other by interposing a liquid layer therebetween, and are equipped with electrodes for applying a voltage to the liquid crystal layer described above. On the uppermost surface, directed to the liquid crystal layer, of each of the pair of substrates for forming the liquid crystal device, an orientation film is formed for controlling alignment of liquid crystal molecules when no voltage is applied. In addition, a structure is provided, in which by optically identifying the alignments of liquid crystal molecules when no voltage is applied and when voltage is applied, respectively, display can be performed.

As orientation films, in general, those wherein the surface of a polymer film such as a polyimide film is subjected to a rubbing treatment are suitably employed. By employing the orientation film having the structure described above, the orientation condition of the liquid crystal molecules when no voltage is applied can be regulated by molecular interaction between the orientation polymers and liquid crystal molecules.

In these liquid crystal devices, a structure to improve reliability of the display, which is a passivation film (coating film) composed of a magnesium compound, is formed on a glass substrate, and an electrode formed from ITO (indium tin oxide) is provided on the passivation film, has been proposed (see, for example, Japanese Unexamined Patent Application, First Publication No. Sho 61-128225, and the like).

On the other hand, in order to orient a liquid crystal, as a structure for controlling a form of an orientation film per se, a product having a structure wherein an orientation controlling layer having a sawtoothed cross-sectional form and being composed of a film of a polymer such as an optically curable resin or a photosensitive resin is provided on a substrate has been proposed (see Japanese Unexamined Patent Application, First Publication No. Hei 1-238619; Japanese Unexamined Patent Application, First Publication No. Hei 9-152612; Japanese Unexamined Patent Application, First Publication No. 2000-155318; and the like).

However, when a liquid crystal device employing a polymer film such as a polyimide film as an orientation film is applied to, for example, a liquid crystal light valve for use in a liquid crystal projector, after longterm use, the polymer film, such as a polyimide film, is deteriorated by the light or heat. As a result, problems arise in that the quality of the display is degraded and reliability is reduced.

In addition, in the liquid crystal light valve described above, in the case of employing ITO as a transparent electrode for driving a liquid crystal at the lower side of the orientation film, if indium (In) or tin (Sn) deposited from the ITO electrode dissolves into the liquid crystal layer, the electric properties of the liquid crystal light valve are altered. As a result, problems arise in that the quality of the display is degraded and reliability is reduced.

In addition, in the structure in which a passivation film is formed on a glass substrate, although effects of preventing dispersion of metal elements such as sodium contained in the glass substrate can be obtained, dissolution of In or Sn deposited from the ITO electrode into the liquid crystal layer cannot be prevented.

Furthermore, when the liquid crystal device having a sawtoothed orientation-controlling layer formed from a polymer film such as an optically curable resin film or a photosensitive resin film, is applied to, for example, a liquid crystal light valve for use in a liquid crystal projector, after longterm use, the polymer film such as an optically curable resin film or a photosensitive resin film is deteriorated due to light or heat. As a result, problems arise in that quality of the display is degraded and reliability is reduced.

BRIEF SUMMARY OF THE INVENTION

The present invention was made in consideration of the circumstances described above. The present invention has as an object to provide a liquid crystal device in which only slight deterioration of an orientation film is exhibited over time, contrast slightly decreases even after longterm use, and display quality can be improved by increasing the axial orientation in the horizontal direction of the liquid crystal. In addition, the present invention has an object to provide electronic equipment exhibiting strong axial orientation in the horizontal direction of the liquid crystal, providing superior display quality, and having improved reliability, by being provided with the liquid crystal device described above.

The present inventor discovered that, in order to solve the problems described above, by providing concave-convex portions, such as sawtoothed portions, for controlling an orientation direction of a liquid crystal layer, which are periodically formed along one direction, and by providing a height difference between a groove and a projecting ridge, having the concave-convex portions formed therein, the area of the side face of the concave-convex portions can be ensured, so that the axial orientation in the horizontal direction of the liquid crystal can be enhanced and display quality can be improved, thus completing the present invention.

A liquid crystal device according to the present invention is characterized by comprising a pair of substrates which are arranged to face each other, a liquid crystal layer interposed between the pair of substrates, an electrode for applying a voltage to the liquid crystal layer, which is provided on a surface, directed to the liquid crystal layer, of each of the pair of substrates; an orientation film for orienting liquid crystal molecules of the liquid crystal layer, which is formed on a surface, directed to the liquid crystal layer, of each of the electrodes, in which on a surface of the orientation film, plural grooves are formed respectively in parallel, and in each of the grooves, concave-convex portions for controlling an orientation direction of the liquid crystal layer are periodically formed along a direction in which the grooves extend, and between an opening of the groove and each of top parts of the concave-convex portions, a height difference is provided.

According to the liquid crystal device described above, by forming plural grooves respectively in parallel on the surface of the orientation film, forming concave-convex portions for controlling an orientation direction of the liquid crystal layer periodically along a direction in which the grooves extend, in each of the grooves, and providing a height difference between an opening of the groove and each of top parts of the concave-convex portions, the area of the side face of the grooves can be ensured, and therefore, the axial orientation in the horizontal direction of the liquid crystal is enhanced. Thereby, display quality can be improved, and reliability is increased.

In the liquid crystal device described above, it may be further provided that a projecting ridge is formed between the grooves adjacent to each other, in each of the projecting ridges, concave-convex portions for controlling an orientation direction of the liquid crystal layer are periodically formed along a direction in which the projecting ridges extend, and a height difference is provided between a bottom part of the projecting ridge and each of the bottom parts of the concave-convex portions.

In the liquid crystal device described above, the area of the side face of the projecting ridges can be ensured, and the axial orientation in a horizontal direction of the liquid crystal is further enhanced. Thereby, display quality can be further improved, and reliability is greatly increased.

Another liquid crystal device according to the present invention is characterized by having a pair of substrates which are arranged to face each other, a liquid crystal layer interposed between the pair of substrates, an electrode for applying a voltage to the liquid crystal layer, which is provided on a surface, directed to the liquid crystal layer, of each of the pair of substrates, an orientation film for orienting liquid crystal molecules of the liquid crystal layer, which is formed on a surface, directed to the liquid crystal layer, of each of the electrodes, in which on a surface of the orientation film, plural projecting ridges are respectively formed in parallel, and in the projecting ridges, concave-convex portions for controlling an orientation direction of the liquid crystal layer are periodically formed along a direction in which the projecting ridges extend, and a height difference is provided between a bottom part of the projecting ridge and each of the bottom parts of the concave-convex portions.

In the liquid crystal device described above, by forming, on a surface of the orientation film, plural projecting ridges respectively arranged in parallel, forming, in the projecting ridges, concave-convex portions for controlling an orientation direction of the liquid crystal layer periodically along a direction in which the projecting ridges extend, and providing a height difference between a bottom part of the projecting ridge and each of the bottom parts of the concave-convex portions, the area of the side face of the projecting ridges can be ensured, and the axial orientation in a horizontal direction of the liquid crystal is enhanced. Thereby, display quality can be improved, and reliability is increased.

In addition, in the liquid crystal device according to the present invention, the height difference described above preferably ranges from 30 nm to 500 nm. Thereby, the area of the side face can be reliably provided, and the axial orientation in the horizontal direction of the liquid crystal can be sufficiently enhanced without impairing display quality.

It is preferable that the electrode formed in the groove via the height difference be maintained in contact with the electrode formed in the projecting ridge via the height difference. Thereby, continuity performance is enhanced, and attenuation of signals and resistance heat are prevented, so that display quality can be enhanced.

The thickness of the electrode is preferably not less than the height difference. Thereby, the electrode formed in the groove via the height difference is maintained in contact with the electrode formed in the projecting ridge via the height difference. For this reason, continuity performance is enhanced, and attenuation of signals and resistance heat are prevented, so that display quality can be enhanced.

It is preferable that the concave-convex portions have a cross-sectional form, along the direction in which the concave-convex portions extend, which is generally triangular. Thereby, pretilt can be provided without disrupting the orientation of the liquid crystal.

On the surface of the substrate, concave-convex portions corresponding to the concave-convex patterns of the concave-convex portions described above may be further formed. Thereby, pretilt can be provided without disrupting the orientation of the liquid crystal.

The electrode described above may be exposed to the liquid crystal layer, and at the same time, the concave-convex portions may be formed on the surface thereof. Thereby, since no passivation film need be provided, the production process can be simplified.

The electronic equipment according to the present invention is provided with the liquid crystal device according to the present invention.

In the electronic equipment of the present invention, by having the liquid crystal device of the present invention, electronic equipment having high axial orientation in the horizontal direction of the liquid crystal is provided, superior display quality is exhibited, and reliability is enhanced.

BRIEF DESCRIPTION OF THE DRAWINGS

FIG. 13A is a schematic view showing an example of a mobile phone; FIG. 13B is a schematic view showing an example of a portable information processor; and FIG. 13C is a schematic view showing an example of a wristwatch type piece of electronic equipment.

DETAILED DESCRIPTION OF THE INVENTION

Embodiments according to the present invention are described in detail below. In each of the embodiments, explanation is made with reference to the drawings. In each of the drawings, in order that each of the layers and each of the members be visible, they are drawn at different scales.

First Embodiment

Based on FIG. 1 to FIG. 6, a structure of a liquid crystal device of the first embodiment according to the present invention is described in detail as an example of a liquid crystal light valve employing a TN mode active matrix type of a transmission type liquid crystal device employing a TFT (thin-film transistor) device as a switching device.

Figure 1:
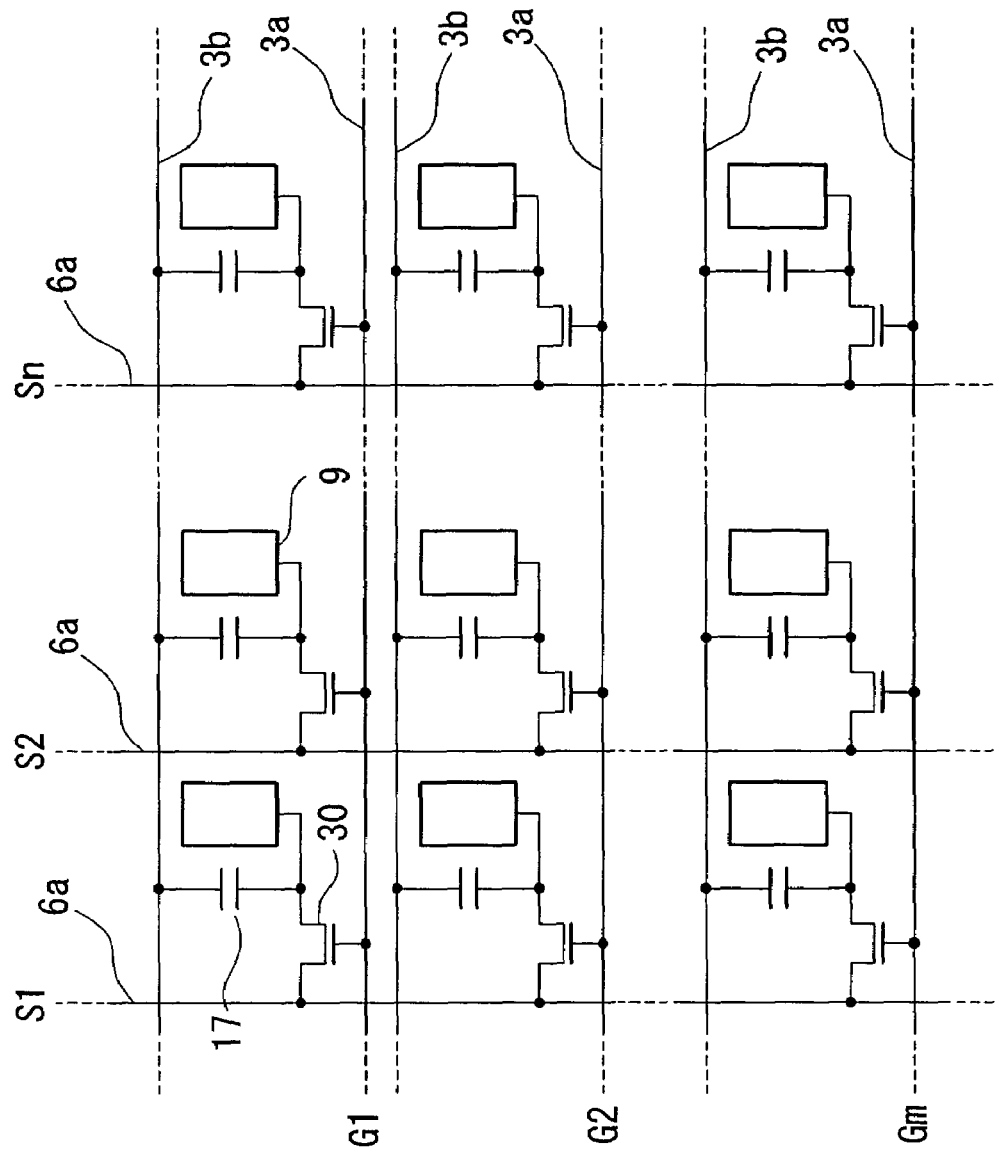
FIG. 1 is an equivalent circuit diagram showing a pixel display region of a liquid crystal light valve of a first embodiment according to the present invention.
Figure 2:
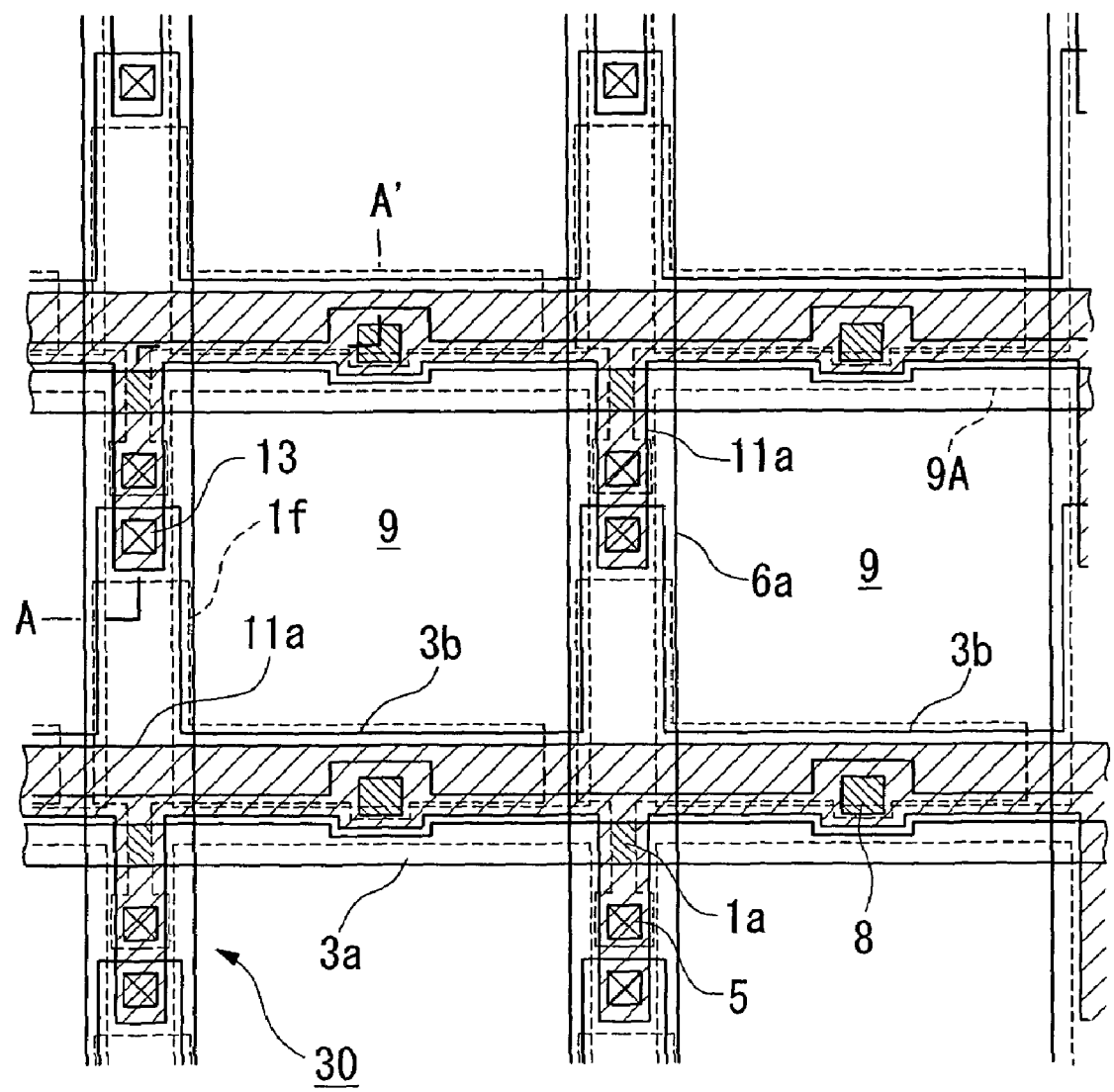
FIG. 2 is a plan view showing a structure of plural pixels of the liquid crystal light valve of the first embodiment according to the present invention.
Figure 3:
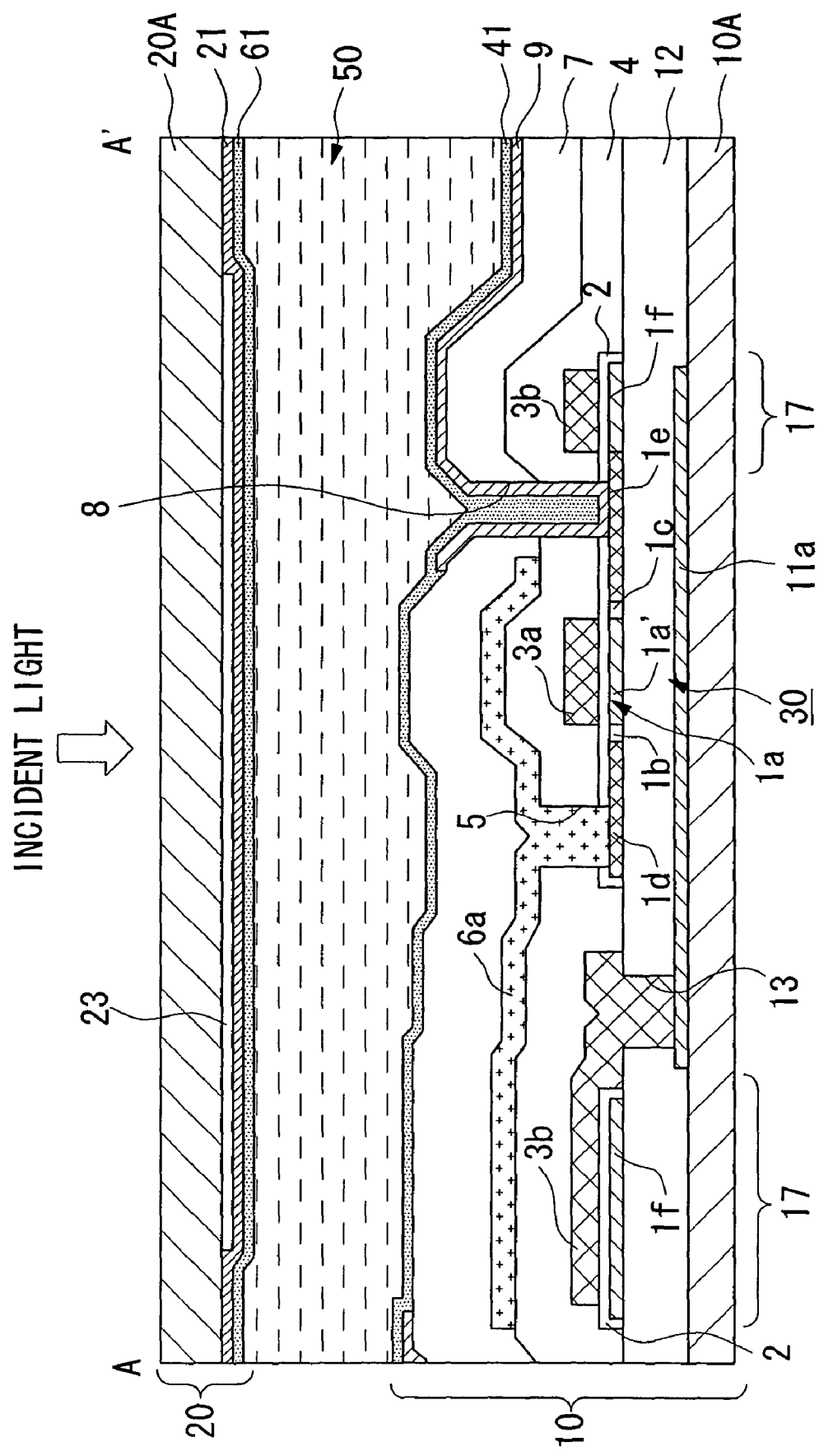
FIG. 3 is a cross-sectional view showing a structure of a TFT region of the liquid crystal light valve of the first embodiment according to the present invention.
Figure 4:
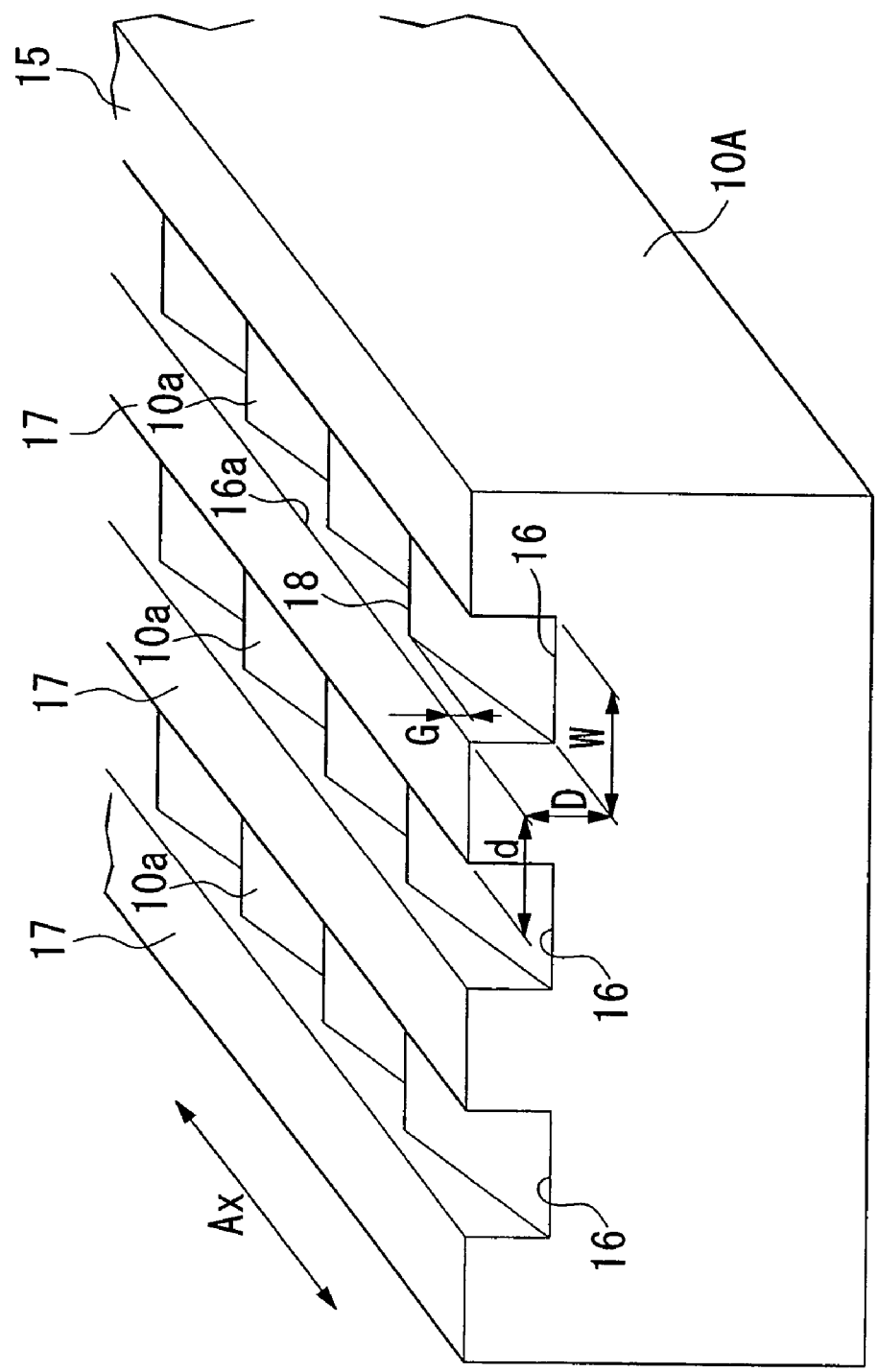
FIG. 4 is a schematic view showing a structure of a pixel region of the liquid crystal light valve of the first embodiment according to the present invention.
Figure 5:
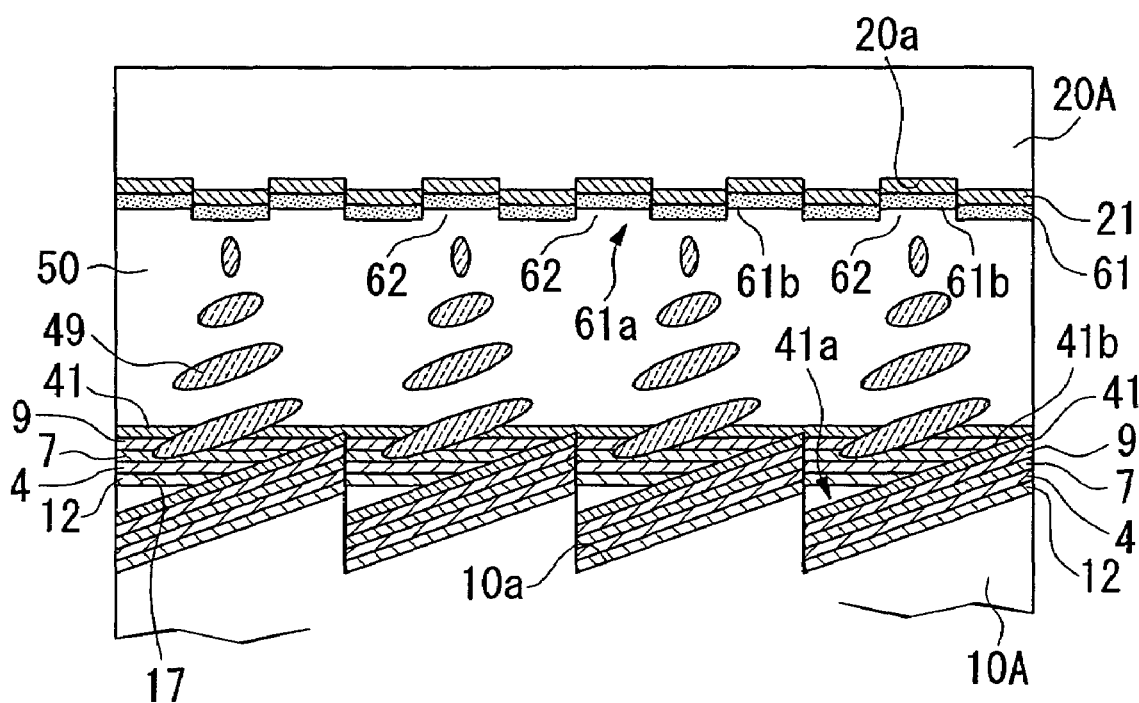
FIG. 5 is a cross-sectional view showing a structure of the pixel region of the liquid crystal light valve of the first embodiment according to the present invention.
Figure 6A:
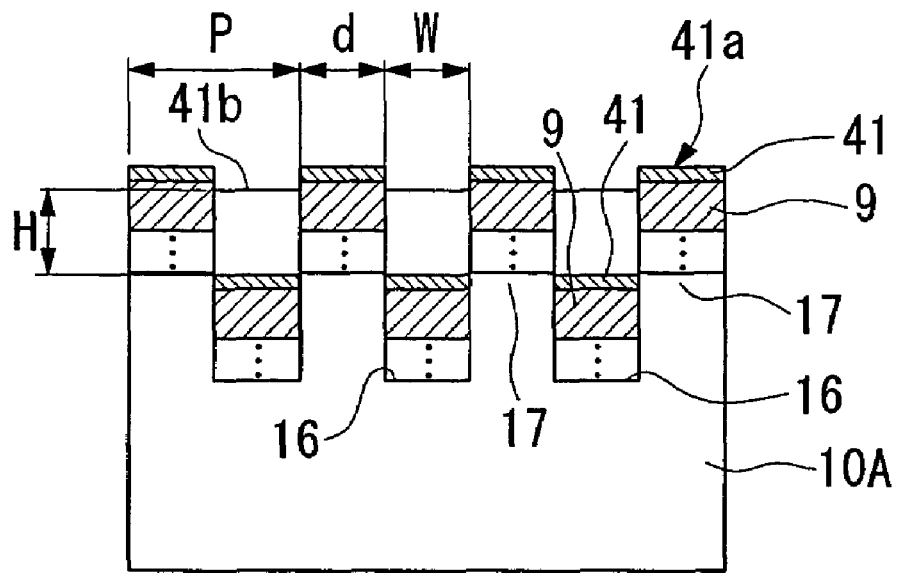
FIG. 6A and FIG. 6B correspond to a drawing of a scale example of an orientation film of the pixel region of the liquid crystal light valve of the first embodiment according to the present invention.
Figure 6B:
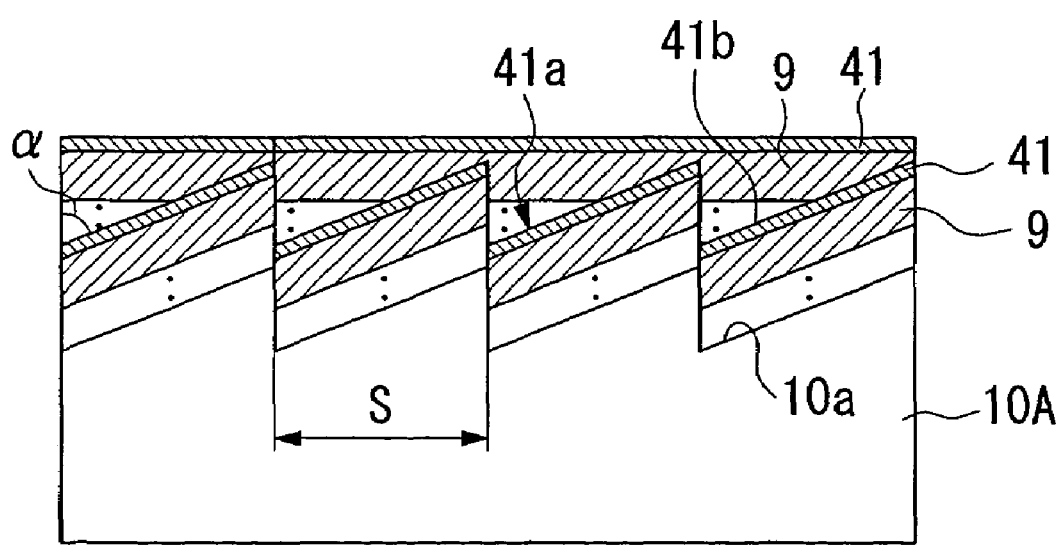

FIG. 1 is an equivalent circuit diagram showing switching devices, signal lines, and the like in plural pixels arranged in a matrix, for constructing an image display region of a liquid crystal light valve of the present embodiment. FIG. 2 is a plan view showing a structure of plural pixels adjacent to each other of a TFT array substrate in which data lines, scanning lines, pixel electrodes, and the like are formed. FIG. 3 is a cross-sectional view showing a structure of the liquid crystal light valve of the present embodiment, which is a cross-sectional view along line A–A' in FIG. 2. FIG. 4 is a schematic view showing a structure of a pixel region of the liquid crystal light valve of the present embodiment. FIG. 5 is a cross-sectional view showing a structure of a pixel region of the liquid crystal light valve of the present embodiment. FIG. 6 is a drawing of a scale example of an orientation film of the pixel region of the liquid crystal light valve of the present embodiment.

As shown in FIG. 1, the liquid crystal light valve comprises plural pixels arranged in a matrix, for constructing an image display region. Each of the pixels has an electrode 9 referred to as a "pixel electrode" hereinafter and a TFT device 30 which is a switching device for controlling the pixel electrode 9 described above. Data lines 6a supplying image signals are electrically connected to a source of the TFT device 30 described above. Image signals S1, S2, . . . , Sn supplied to the data lines 6a are respectively supplied in series of the lines or are supplied to each of the groups with respect to plural data lines 6a adjacent to each other.

In addition, scanning lines 3a are electrically connected to the gates of the TFT devices 30. With respect to plural scanning lines 3a, scanning signals G1, G2, . . . , Gm are applied as pulses in series of the lines with a specified timing. In addition, the pixel electrode 9 is electrically connected to a drain of the TFT device 30. By setting the TFT device 30 "on" for a fixed period, the image signals S1, S2, . . . , Sn supplied from the data lines 6a are written with a specified timing.

The image signals S1, S2, . . . , Sn in a specified level which are written in the liquid crystal via the pixel electrodes 9 are held between the pixel electrode and a common electrode described below for a fixed period. The liquid crystal can modulate light and can perform gradated display by varying the orientation or order of the molecular aggregation, based on the applied voltage level. Here, in order to prevent leaking of the held image signals, an accumulation capacity 17 is, in parallel, added to the liquid crystal capacity formed between the pixel electrode 9 and the common electrode.

Planar Structure

Next, a planar structure of the liquid crystal light valve according to the present embodiment is described based on FIG. 2.

In the liquid crystal light valve, on the TFT array substrate, plural pixel electrodes 9, in the form of a rectangle, composed of a transparent conductive material such as ITO (indium tin oxide) are provided in a matrix, and data line 6a, scanning line 3a, and capacitance line 3b are respectively provided along the horizontal and vertical boundaries of the pixel electrode 9. Herein, the outline of the pixel electrode 9 is shown by dotted line 9A.

In the present embodiment, the region, in which each of pixel electrodes 9 is formed and the data line 6a, scanning line 3a, capacitance line 3b, and the like provided so as to surround each of pixel electrodes 9 are formed, corresponds to a pixel. This is constructed so that display can be performed by each of the pixels arranged in a matrix.

The data line 6a is electrically connected to a source region described below via a contact hole 5 in a semiconductor layer 1a composed of, for example, a polysilicon film, for forming the TFT device 30. The pixel electrode 9 is electrically connected to a drain region described below via a contact hole 8 in the semiconductor layer 1a. In addition, in the semiconductor layer 1a, the scanning line 3a is arranged so as to face a channel region described below (corresponding to a region shown by crosshatching inclined to the left in the drawing). A structure that the scanning line 3a functions as a gate electrode at a part facing the channel region is provided.

The capacitance line 3b has a main line part (in plan view, a first region formed along the scanning line 3a) extending generally straight along the scanning line 3a, and has a projecting ridge part (in plan view, a second region formed along the data line 6a) projecting from a crossing point with the data line 6a to a pre-stage side (an upper direction in the drawing). In addition, in FIG. 2, plural first light-blocking films 11a are provided in a region shown by crosshatching inclined to the right (such as ////) in the drawing.

More particularly, each of the first light-blocking films 11a is provided at the place covering the TFT device 30 including the channel region of the semiconductor layer 1a from the view of the TFT array substrate side. Furthermore, each of the first light-blocking films 11a has a main line part extending straight along the scanning line 3a and facing the main line part of the capacitance line 3b, and has a projection part projecting from a crossing point with the data line 6a to the adjacent post-stage side (a lower direction in the drawing), and extending along the data line 6a. The top part of the projection part in the lower direction in each of stages (pixel lines) of the first light-blocking film 11a overlaps with the top part of the projection part in the upper direction of the capacitance line 3b in the followed stage under the data line 6a. In the overlapped part, a contact hole 13 mutually and electrically connecting to the first light-blocking film 11a and the capacitance line 3b is provided. That is, in the present embodiment, the first light-blocking film 11a is electrically connected to the capacitance line 3b of the pre-stage or post-stage by the contact hole 13.

Cross-sectional Structure

Next, a cross-sectional structure of the liquid crystal light valve of the present embodiment is described, based on FIG. 3.

The liquid crystal light valve comprises the TFT array substrate 10, another substrate 20 facing the substrate 10, and the liquid layer 50 composed of a TN liquid crystal, and is interposed between the substrate 10 and the substrate 20. The TFT array substrate 10 mainly comprises a substrate body 10A composed of a translucent material such as quartz, the pixel electrode 9 formed on the surface thereof directed to the liquid crystal layer 50, the TFT device 30, and an orientation film 41 containing a magnesium compound. The facing substrate 20 mainly comprises a substrate body 20A composed of a translucent material such as glass or quartz, a common electrode 21 formed on the surface thereof directed to the liquid crystal layer 50, and an orientation film 61 containing a magnesium compound.

More particularly, in the TFT array substrate 10, on the surface of the substrate body 10A directed to the liquid crystal layer 50, the pixel electrode 9 is provided. At a position adjacent to each of the pixel electrodes 9, the TFT device 30 for use in pixel switching for switching-controlling each of the pixel electrodes 9 is provided.

The TFT device 30 for use in pixel switching has an LDD (lightly doped drain) structure, and comprises the scanning line 3a, a channel region 1a' of the semiconductor layer 1a in which a channel is formed by an electric field from the scanning line 3a described above, a gate insulating film 2 for insulating the scanning line 3a and the semiconductor layer 1a, the data line 6a, a low-concentration source region 1b and a low-concentration drain region 1c of the semiconductor layer 1a, and a high-concentration source region 1d and a high-concentration drain region 1e of the semiconductor layer 1a.

In addition, on the substrate body 10A disposed on the gate insulating film 2 and on the scanning line 3a described above, the contact hole 5 communicating to the high-concentration source region 1d, and a second layer-to-layer insulating film 4 in which a contact hole 6 communicating to the high-concentration drain region 1e is opened are formed. That is, the data line 6a is electrically connected to the high-concentration source region Id via the contact hole 5 passing through the second layer-to-layer insulating film 4. Furthermore, on the data line 6a and on the second layer-to-layer insulating film 4, a third layer-to-layer insulating film 7 wherein a contact hole 8 communicating to the high-concentration drain region 1e is opened is formed. That is, the high-concentration drain region 1e is electrically connected to the pixel electrode 9 via the contact hole 8 passing through the second layer-to-layer insulating film 4 and the third layer-to-layer insulating film 7.

In addition, in the present embodiment, the gate insulating film 2 is employed as a dielectric film by extending from a position facing the scanning line 3a. The semiconductor film 1a is extended to provide a first accumulated capacitance electrode 1f. In addition, a part of the capacitance line 3b facing thereto is provided as a second accumulated capacitance electrode. Thereby, an accumulated capacitance 17 is provided.

In addition, in the region in which, in each of the TFT devices 30 for pixel switching is formed on the surface directed to the liquid crystal layer 50 of the substrate body 10A of the TFT array substrate 10, the first light-blocking film 11a is provided, which is for preventing returning light, which is transmitted by the TFT array substrate 10 and returns to the liquid crystal layer 50 side by reflection at the interface between the lower face of the TFT array substrate 10, that is, TFT array substrate 10, and air, from being incident to at least the channel region 1a' and the low concentration source, and the drain regions (LDD regions) 1b and 1c of the semiconductor layer 1a.

In addition, between the first light-blocking film 1a and the TFT device 30 for pixel switching, a first layer-to-layer insulating film 12 is provided, which is for electrically insulating the semiconductor layer 1a constituting the TFT device 30 for pixel switching from the first light-blocking film 11a.

In addition, as shown in FIG. 2, in addition to providing the first light-blocking film 11a to the TFT array substrate 10, the first light-blocking film 11a is constructed so as to electrically connect to the capacitance line 3b of the pre-stage or post-stage via a contact hole 13.

In addition, as shown in FIG. 3, on the uppermost surface directed to the liquid crystal layer 50 of the substrate body 10A of the TFT array substrate 10, the orientation film 41 containing a magnesium compound for controlling the orientation direction and the pretilt angle of the liquid crystal molecules in the liquid crystal layer 50 at the time of applying no voltage is formed so as to cover the pixel electrode 9 and a third layer-to-layer insulating film 7 at the region in which the pixel electrode 9 described above is not provided.

On the pixel region of the substrate body 10A, as shown in FIG. 4, on the surface 15 thereof, plural grooves 16 having a width W and a depth D are formed in parallel with a predetermined distance d. A long region having a rectangular cross-sectional form projecting to an upper direction, which is present between these grooves 16 and 16, is a projecting ridge (stripe) 17.

In each of these grooves 16, 16, . . . , concave-convex portions 10a are formed, which have a predetermined width W, periodically vary along an axial orientation direction Ax of the liquid crystal, and have a cross-sectional form, along the axial orientation direction Ax, of saw teeth (triangular form). Between an opening 16a of the groove 16 and each of the top parts 18 of the concave-convex portions 10a, a height difference G is provided.

On the sawtoothed concave-convex portions 10a and on the projecting ridge 17, as shown in FIG. 5, the first layer-to-layer insulating film 12, the second layer-to-layer insulating film 4, the third layer-to-layer insulating film 7, the pixel electrode 9, and the orientation film 41 containing a magnesium compound are successively layered in a stacked manner. The surface 41b of the orientation film 41 formed on the concave-convex portions 10a has the same form as that of the concave-convex portions 10a.

That is, the surface of the pixel region of the orientation film 41 is formed into concave-convex portions 41a which periodically vary along the axial orientation direction of the liquid crystal (horizontal direction in the drawing), and are in a sawtoothed cross-sectional form, along the axial orientation direction of the liquid crystal. The sawtoothed concave-convex portions 41a are provided so that plural columns thereof are formed spaced at a predetermined distance d, in exactly the same manner as that of the sawtoothed concave-convex portions 10a described above.

The orientation film 41 not only controls an orientation direction of a TN liquid crystal 49 by providing the groove 16 and the height difference G and controls a pretilt angle due to the sawtoothed concave-convex portions 10a, but also prevents dispersion of impurities from the pixel electrode 9 provided on the lower side of the orientation film 41 and metal elements such as In and Sn to the liquid crystal layer 50 by containing a magnesium compound. As described above, by preventing the dispersion of metal elements such as In and Sn to the liquid crystal layer 50, even in the case of longterm use, the function of the liquid crystal layer 50 cannot be degraded, so that high reliability can be maintained.

On the other hand, in the facing substrate 20, on the surface of the pixel region of a substrate body 20A, concave-convex portions 20a are formed, which periodically vary along the axial orientation direction of the liquid crystal (the vertical direction to the drawing), and are in the cross-sectional form, along the axial orientation direction, of saw teeth (triangle form). The sawtoothed concave-convex portions 20a have a predetermined width W defined by plural grooves 62 formed vertically in the drawing. On the saw-toothed concave-convex portions 20a, a common electrode 21 and an orientation film 61 are successively layered in a stacked manner. The surface 61b of the orientation film 61 has the same form as that of the surface of the substrate body 20A.

That is, the surface of the orientation film 61a is formed into concave-convex portions 61a in a sawtoothed cross-sectional form (a triangular form) periodically varying along one direction on the surface (the vertical direction in the drawing). The sawtoothed concave-convex portions 61a have a predetermined width W defined by plural grooves 62 formed vertically in the drawing, in exactly the same manner as that of the sawtoothed concave-convex portions 20a described above.

The orientation film 61 not only controls an orientation direction of a TN liquid crystal 49 by providing the groove 61 and the height difference G and controls a pretilt angle due to the sawtoothed concave-convex portions 10a, and but also prevents dispersion of impurities from the common electrode 21 provided on the lower side of the orientation film 61 and metal elements such as In and Sn to the liquid crystal layer 50 by containing a magnesium compound, in the same manner as that of the orientation film 41 described above. As described above, by preventing the dispersion of metal elements such as In and Sn to the liquid crystal layer 50, even in the case of longterm use, the function of the liquid crystal layer 50 cannot be degraded, so that high reliability can be maintained.

As the magnesium compound forming the orientation film 41 or 61 described above, for example, a magnesium oxide or a magnesium salt is preferable. As the magnesium oxide described above, MgO (magnesium oxide) is preferable, and as the magnesium salt described above, $MgF_2$ (magnesium fluoride) is preferable.

Here, the size of the height difference G or the like is explained.

The height difference G preferably ranges from 30 nm to 500 nm, and more preferably ranges from 100 nm to 250 nm.

Here, the reason why the range of the height difference G is restricted to from 30 nm to 500 nm is described. If the height difference G is smaller than 30 nm, the side area of the groove cannot be ensured, and for this reason, the axial orientation of the liquid crystal is decreased, thus impairing display quality. On the other hand, if the height difference G exceeds 500 nm, the retardation gap due to the concave-convex portions reflects the cell gap, thus impairing display quality. Within the range described above, the axial orientation in the horizontal direction of the liquid crystal can be sufficiently secured so that display quality is not impaired.

The thickness of the pixel electrode or the common electrode 21 is set to be not less than the height difference G. For example, in the case where the height difference G is 200 nm, the thickness of the pixel electrode 9 and the common electrode 21 is 200 nm or more.

The preferable range of the thickness of the pixel electrode 9 and the common electrode 21 described above is from 30 nm to 500 nm, and is more preferably from approximately 100 nm to 250 nm.

As the reason thereof, if the film thickness of the electrode is smaller than the height difference G, resistance increases, so that it is not suitable as an electrode. Within the range described above, conductive performance is improved, and attenuation of signals or resistance heat is prevented, so that display quality can be improved.

The pixel electrode 9 provided on the concave-convex portions 10a and the pixel electrode 9 provided on the projecting ridge (stripe) 17 are maintained in contact with each other. The thickness of the contacted part is, for example, approximately ½ of the film thickness of the pixel electrode 9.

In addition, the film thickness of the orientation film 41 or 61 preferably ranges from 50 nm to 500 nm, and in particular, is preferably approximately 250 nm.

The reasons thereof are described. If the film thickness of the orientation film 41 or 61 is less than 50 nm, effects of preventing the dispersion of impurities from the electrode (pixel electrode 9 or common electrode 21) or metal elements such as In and Sn to the liquid crystal layer 50 are insufficient, so that deterioration of the orientation films 41 and 61 may not be prevented. On the other hand, if the film thickness exceeds 500 nm, a distance between the liquid crystal layer 50 and the electrode (pixel electrode 9 or common electrode 21) increases, so that the voltage for driving the liquid crystal layer 50 is increased.

In the size of the sawtoothed concave-convex portions 41a or 61a of the orientation film 41 or 61 described above, it is preferable that the height H range from 30 nm to 500 nm, the parallel groove pitch P range from 10 nm to 1500 nm, the width W range from 5 nm to 750 nm, and the angle α with respect to the vertical direction of the saw tooth range from 2° to 28° (the length of the saw tooth in the horizontal direction $S=H/(\tan(90°-\alpha))$).

Manufacturing Method

Next, as an example of a method for manufacturing a liquid crystal light valve having the structure described above, a method for manufacturing the liquid crystal of the embodiment of the present invention is described.

First, for example, by means of a laser beam processing method or the like, the groove 16 and the sawtoothed concave-convex portions 10a are formed on the surface of the substrate body 10A. In this case, the depth D of the groove 16 and the height H of the concave-convex portions 10a are set so that the height difference G ranges from 30 nm to 500 nm.

Subsequently, on the sawtoothed concave-convex portions 10a, the first layer-to-layer insulating film 12, the second layer-to-layer insulating film 4, and the third layer-to-layer insulating film 7, which are composed of $SiO_2$, are successively formed by, for example, an MOCVD method or the like. On the third layer-to-layer insulating film 7, a pixel electrode 9, such as one of ITO, is formed by, for example, a deposition method or a sputtering method so that a thickness thereof is not less than the height difference G. On the surface thereof, the fine orientation film 41 having no voids is formed by, for example, an EB (electron beam) vacuum deposition method, an ion plating method, or the like so that a film thickness thereof ranges from 50 nm to 500 nm.

As described above, the TFT array substrate 10 wherein necessary elements are formed can be manufactured.

On the other hand, in exactly the same manner as that of the substrate body 10A described above, sawtoothed concave-convex portions 20a are formed on a substrate body 20A, and by subsequently layering the common electrode 21 and the orientation film 61 on the sawtoothed concave-convex portions 20a, in a stacked manner, the facing substrate 10 at which necessary elements are formed can be manufactured. As necessary, on the common electrode directed to the substrate 10A, a black matrix for light-blocking line parts may be arranged.

A method for forming the orientation film 61 is the same as the method for forming the orientation film 41 of the TFT array substrate, and for this reason, it is omitted from the description.

Subsequently, at the peripheral part of one substrate among the TFT array substrate 10 and the facing substrate 20, a sealing material is applied. The TFT array substrate 10 and the facing substrate 20 are affixed via the sealing material, with a cell gap, such as approximately 3 $\mu$m, by shifting the orientations of these substrates 10 and 20 to 90° so that the direction in which the orientation film 41 extends crosses the direction in which the orientation film 61 extends, thus manufacturing a liquid crystal cell.

Subsequently, in the liquid crystal cell, a TN liquid crystal is injected via a liquid crystal injection pore, followed by sealing the liquid crystal injection pore by means of a sealant.

According to the liquid crystal light valve of the present embodiment, on the surface 15 of the pixel region of the substrate body 10A, plural grooves 16 are formed in parallel with a predetermined gap d. In each of these grooves 16, 16, . . . , concave-convex portions 10a are formed, which periodically vary along an axial orientation direction Ax of the liquid crystal, and have a sawtoothed cross-sectional form, along the axial orientation direction Ax. Between the opening 16a of the groove 16 and each of the top parts 18 of the concave-convex portions 10a, the height difference G is provided. Thereby, the side area of the groove 16 can be ensured, so that the axial orientation in the horizontal direction of the TN liquid crystal 49 can be improved. For this reason, display quality can be improved, and reliability as a light valve can be secured.

Second Embodiment

Figure 7:
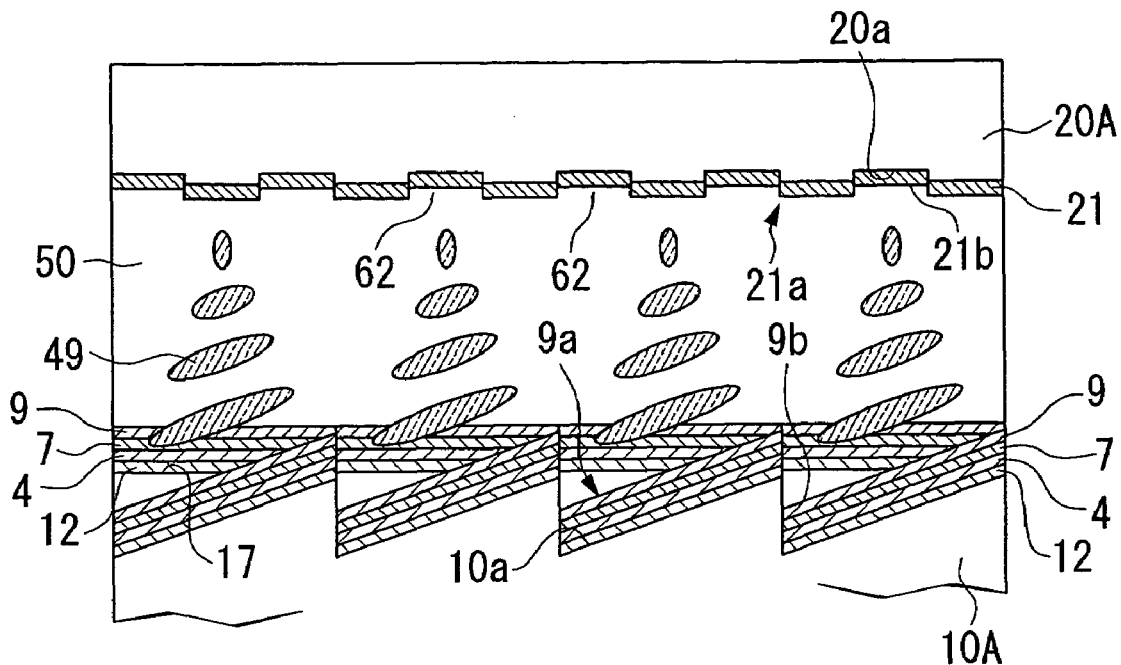
FIG. 7 is a cross-sectional view showing a structure of a pixel region of a liquid crystal light valve of a second embodiment according to the present invention.

FIG. 7 is a cross-sectional view showing a structure of a pixel region of a liquid crystal light valve of the second embodiment according to the present invention.

In the liquid crystal light valve, the orientation film 41 and the orientation film 61 of the first embodiment are removed, a surface 9b of a pixel electrode 9 exposed to a liquid crystal layer 50 is formed into concave-convex portions 9a having the same form as that of concave-convex portions 10a, and in the same manner, a surface 21b of a common electrode 21 is formed into concave-convex portions 21a having the same form as that of concave-convex portions 20a. Parts other than those described above are exactly the same as those of the liquid crystal light valve of the first embodiment.

As described above, in the case in which dispersion of impurities from the pixel electrode 9 and metal elements such as In and Sn to the liquid crystal layer 50 is not a problem, the orientation films 41 and 61 can be removed.

In the liquid crystal light valve of the present embodiment, although there are no orientation films 41 and 61, the surface 9b of the pixel electrode 9 is formed into the concave-convex portions 9a having the same form as that of the concave-convex portions 10a, and in the same manner, the surface 21b of the common electrode 21 is formed into the concave-convex portions 21a having the same form as that of the concave-convex portions 20a. For this reason, the axial orientation in the horizontal direction of the liquid crystal within an acceptable range can be secured.

In addition, the manufacturing steps for forming the orientation films 41 and 61 are not necessary. For this reason, manufacturing steps can be simplified, and reduction in production cost can be achieved.

Third Embodiment

Figure 8:
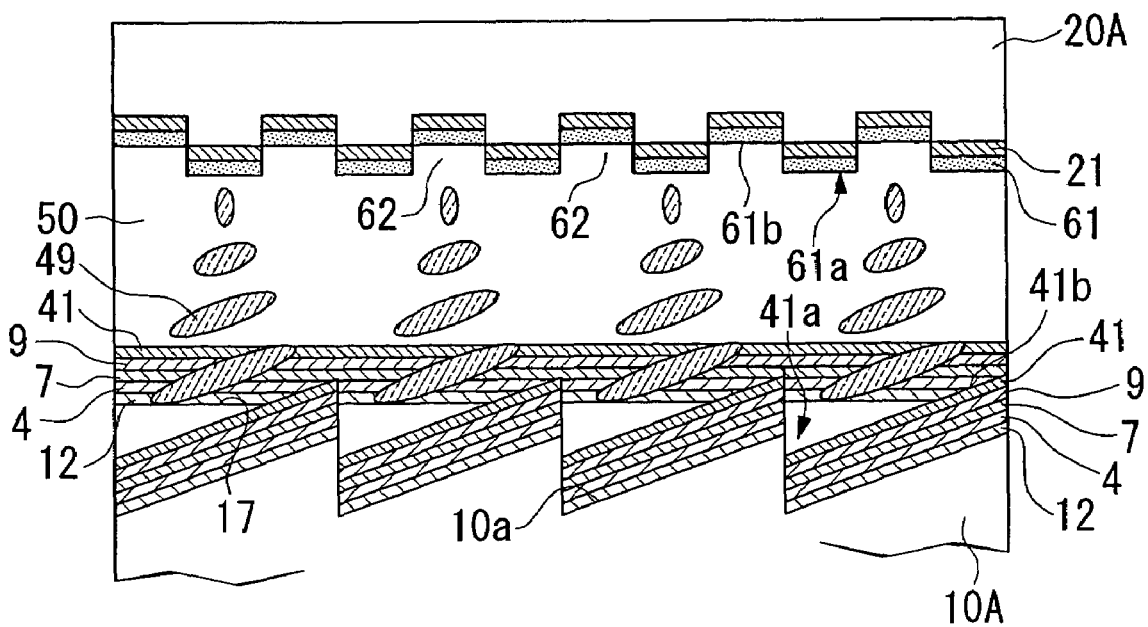
FIG. 8 is a cross-sectional view showing a structure of a pixel region of a liquid crystal light valve of a third embodiment according to the present invention.

FIG. 8 is a cross-sectional view showing a structure of a pixel region of a liquid crystal light valve of the third embodiment according to the present invention.

In the liquid crystal light valve, by providing a height difference corresponding to a film thickness of, for example, one or more layers between a pixel electrode 9 formed on concave-convex portions 10a and a pixel electrode 9 formed on a projecting ridge (stripe) 17, the pixel electrodes 9 described above do not come into contact with each other. Parts other than those described above are exactly the same as those of the liquid crystal light valve of the first embodiment.

As described above, in the case in which resistance of the electrode materials is sufficiently low, and there are no problems in deterioration of signals and heating, the structure described above can be applied. Thereby, the electrode materials can be conserved, and processing time can be reduced.

Even in the liquid crystal light valve described above, the axial orientation in the horizontal direction of the TN liquid crystal 49 can be enhanced, display quality can be improved, and reliability as a light valve can be also secured.

Fourth Embodiment

Figure 9:
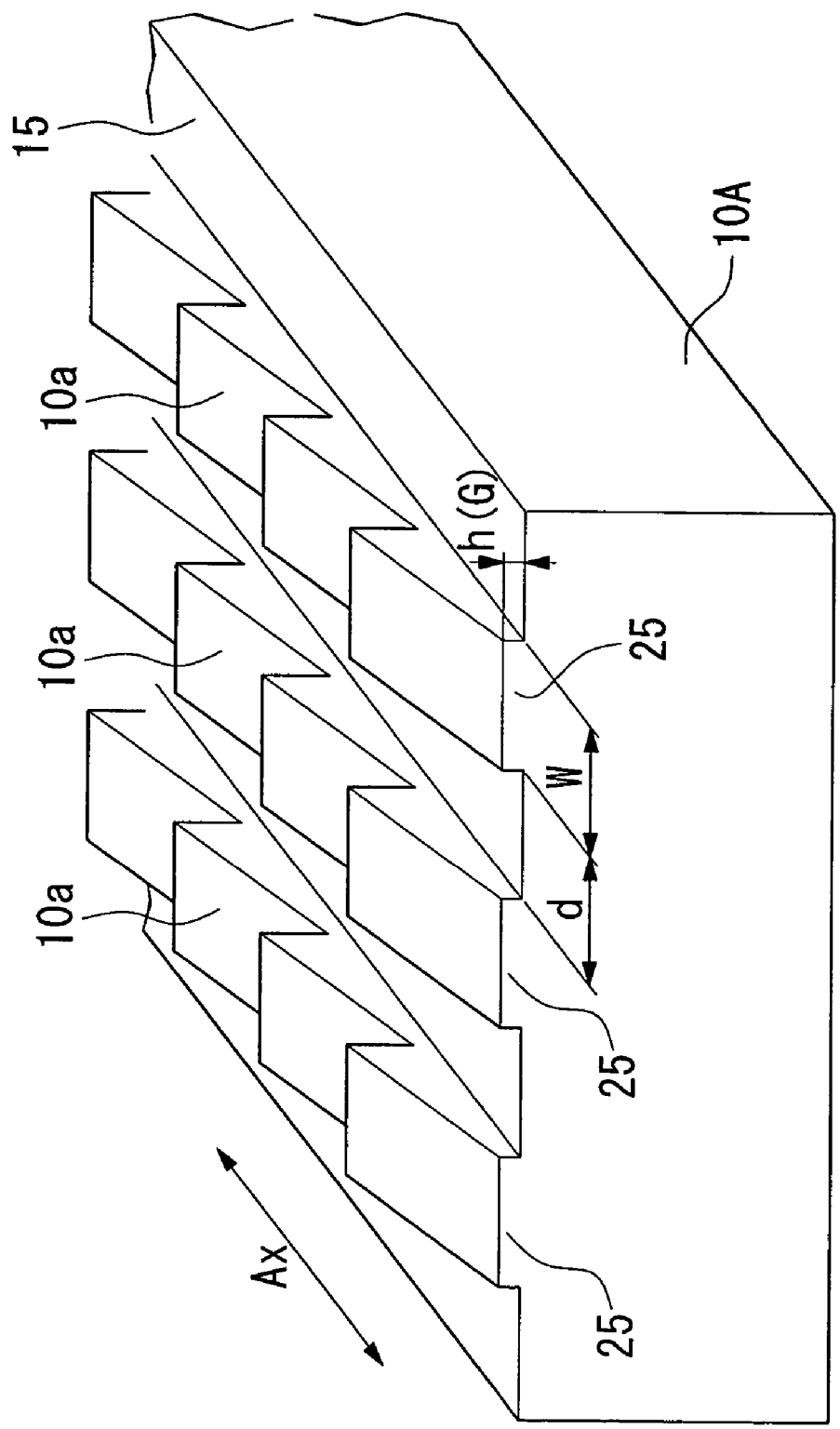
FIG. 9 is a schematic view showing a structure of a pixel region of a liquid crystal light valve of a fourth embodiment according to the present invention.
Figure 10:
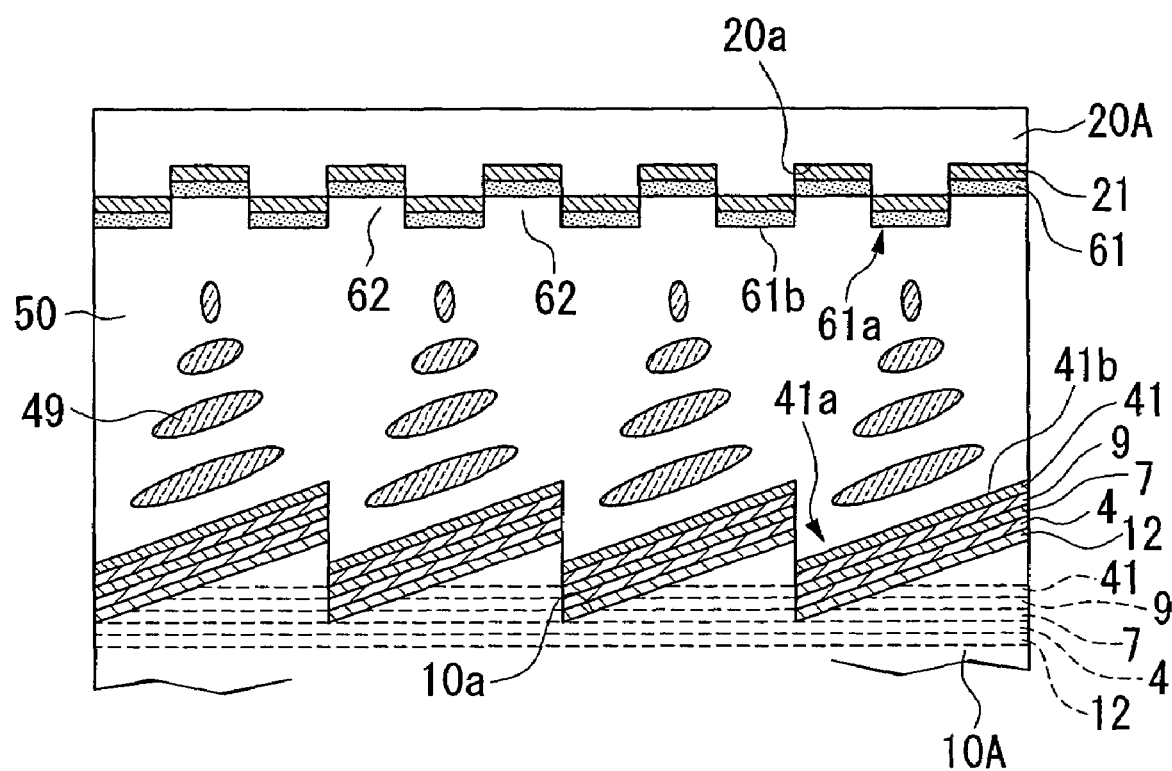
FIG. 10 is a cross-sectional view showing the structure of the pixel region of the liquid crystal light valve of the fourth embodiment according to the present invention.
Figure 11A:
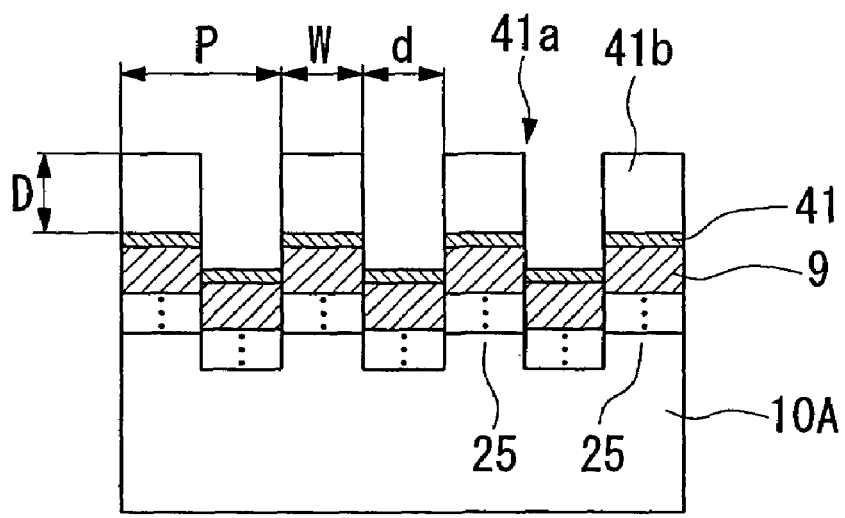
FIG. 11A and FIG. 11B correspond to a drawing of a scale example of an orientation film of the pixel region of the liquid crystal light valve of the fourth embodiment according to the present invention.
Figure 11B:
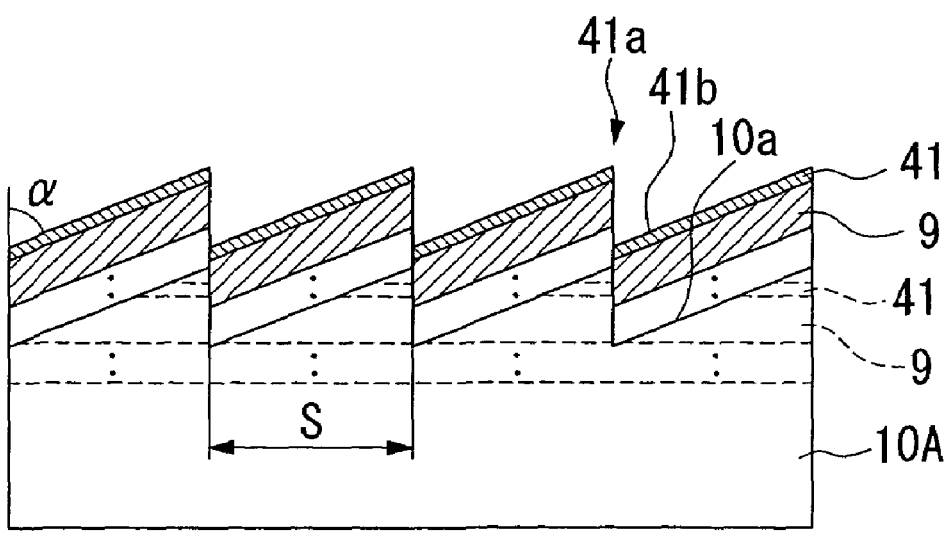

FIG. 9 is a schematic view showing a structure of a TFT array substrate of a liquid crystal light valve of the fourth embodiment according to the present invention. FIG. 10 is a cross-sectional view showing the structure of the pixel region of the liquid crystal light valve of the present embodiment. FIG. 11 is a drawing of a scale example of an orientation film of the pixel region of the liquid crystal light valve of the present embodiment.

In the liquid crystal light valve, on a surface 15 of a pixel region of a substrate body 10A, plural projecting ridges (stripes) 25 having a width W and a height h (=height difference G) are formed in parallel with a predetermined distance d. On the upper face of each of the projecting ridges 25, concave-convex portions 10a are formed, which periodically vary along an axial orientation direction Ax of the liquid crystal, and have a cross-sectional form, along the axial orientation direction Ax, of saw teeth (generally triangular form). Parts other than this are completely the same as those of the liquid crystal light valve of the first embodiment.

Here, the height h of the projecting ridge 25, that is, the height difference G preferably ranges from 30 nm to 500 nm, and more preferably ranges from 100 nm to 250 nm, in the same manner as described in the height difference G of the first embodiment.

As the size of the sawtoothed concave-convex portions 41a and the sawtoothed concave-convex portions 61a of the orientation film 41 and the orientation film 61 described above, respectively, in general, as shown in FIG. 6, it is preferable that the height H range from 30 nm to 500 nm, the parallel groove pitch P range from 10 nm to 1500 nm, the width W range from 5 nm to 750 nm, the angle α with respect to the vertical direction of the saw tooth range from 2° to 88° (the length S of the horizontal direction of the saw tooth=H/(tan(90°−α))).

Even in the liquid crystal light valve described above, the axial orientation in the horizontal direction of the TN liquid crystal 49 can be enhanced, display quality can be improved, and reliability as a light valve can be also improved.

In each of the embodiments described above, on the surface of the substrate body 10A, the concave-convex portions 10a in a sawtoothed cross-sectional form along an axial orientation direction Ax are formed, and on the sawtoothed concave-convex portions 10a, the first layer-to-layer insulating film 12 and the like are subsequently layered in a stacked manner. However, the cross-sectional form of the concave-convex portions 10a is merely one example, and may be, for example, an obtuse triangle form.

In addition, instead of forming the sawtoothed concave-convex portions 10a on the surface of the substrate body 10A, sawtoothed concave-convex portions 10a may be formed on the surface of any one of the first layer-to-layer insulating film 12 to the third layer-to-layer insulating film 7 when the first layer-to-layer insulating film 12 and the like are successively layered in a stacked manner on a flat surface of the substrate body 10A. In particular, by forming it on the third layer-to-layer insulating film 7 as the uppermost surface, the concave-convex pattern can be more accurately reproduced on the pixel electrode 9, and for this reason, controlling properties of the orientation of the liquid crystal can be improved.

Similarly, each of the embodiments described above has a construction in which the sawtoothed concave-convex portions 20a are formed on the surface of the substrate body 20A, and on the sawtoothed concave-convex portions 20a, the common electrode 21 and the orientation film 61 are successively layered in a stacked manner. However, on a flat surface of a substrate body 20A, a common electrode 21 may be formed as a film, sawtoothed concave-convex portions 20a may be formed on the surface of the common electrode 21, and an orientation film 61 may be subsequently layered on the sawtoothed concave-convex portions 20a in a stacked manner.

In addition, in each of the embodiments described above, in the groove 16, or alternatively, in the projecting ridge (stripe) 25, the concave-convex portions 10a are formed, which periodically vary along an axial orientation direction Ax, and have a sawtoothed cross-sectional form along an axial orientation direction Ax. However, in both the groove 16 and the stripe 25, the concave-convex portions 10a may be formed. In this case, for example, between the opening 16a of the groove 16 and each of the top parts of the concave-convex portions 10a, a height difference G is provided, and the height h of the projecting ridge (stripe) 25 may be the height difference G.

In addition, in the present embodiments, only liquid crystal light valves of TN modes are described. However, it should be understood that the present invention is not limited thereto, and the present invention can be applied to liquid crystal devices in all orientation conditions of the liquid crystal molecules at the time of applying no voltage, such as an ECB mode, a vertical orienting mode, an STN (super twisted nematic) mode, a ferroelectric mode, and an anti-ferroelectric mode.

In the case in which the present invention is applied to a vertical orienting mode of a liquid crystal device, a liquid crystal layer may be composed of a liquid crystal having a negative dielectric-constant anisotropy, in which the short-axis direction of the liquid crystal is easily depolarized, as compared to the longitudinal axis direction. In this case, at the time of applying no voltage, the liquid crystal molecules in the liquid crystal layer are controlled by the orientation film, and are aligned in a predetermined direction; and on the other hand, at the time of applying a voltage, the liquid crystal molecules in the liquid crystal layer are aligned so that the longitudinal axis direction is directed to the generally perpendicular parallel direction with respect to the direction of the longitudinal electric field generated between a pair of substrates. For this reason, the alignment of the liquid crystal molecules when no voltage is applied and the alignment of the liquid crystal molecules when a voltage is applied can be optically identified, and display can be performed.

In addition, in each of the embodiments described above, only cases using an active matrix type of liquid crystal light valve with a TFT device are described. However, it should be understood that the present invention is not limited to these embodiments. The present invention can be applied to an active matrix type of liquid crystal light valve with a 2 terminal type device represented by a TFD (thin-film diode) device, and the like.

In addition, in each of the embodiments described above, cases of a transmission type liquid crystal light valve are described. However, it should be understood that the present invention is not limited to the embodiments described above, so long as a construction is provided, in which a height difference is provided in a groove or in a projecting ridge (stripe), or alternatively in both them. For example, the present invention can be applied to reflection type or semi-transmission type liquid crystal light valves other than the transmission type liquid crystal light valve, and can be applied to liquid crystal devices having any structure.

Electronic Equipments

Next, examples of electronic equipment equipped with any one of the liquid crystals employed in the liquid crystal light valves according to the first to fourth embodiments of the present invention described above are described.

Figure 12:
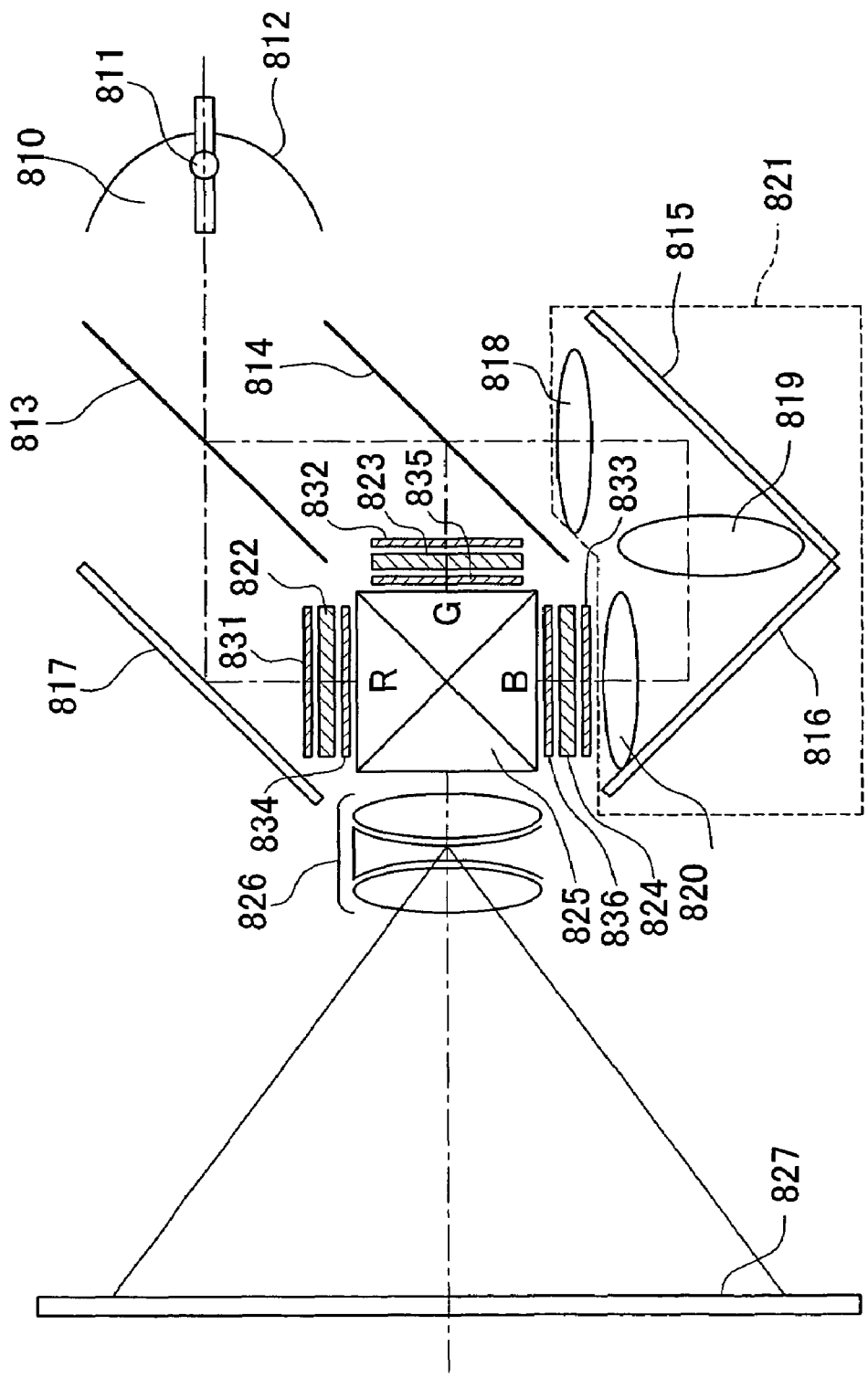
FIG. 12 is a structural drawing showing an important part of a projecting ridge type display apparatus employing any one of the liquid crystal devices of the first to fourth embodiments according to the present invention, as a light modulator.

FIG. 12 is a general structural drawing showing important parts of a projection type display apparatus employing any one of the liquid crystal devices of the first to fourth embodiments according to the present invention, as a light modulator. In FIG. 12, reference numeral "810" indicates a light source, reference numerals "813" and "814" each indicate a dichroic mirror lens, reference numerals "815", "816", and "817" indicate a reflection mirror, reference numeral "818" indicates an incident lens, reference numeral "819" indicates a relay lens, reference numeral "820" indicates an outgoing lens, reference numerals "822", "823", and "824" each indicate a liquid crystal light modulator, reference numeral "825" indicates a cross dichroic prism, reference numeral "826" indicates a projection lens, reference numerals "831", "832", and "833" each indicate a polarizing plate of the incidence side, and reference numerals "834", "835", and "836" each indicate a polarizing plate of the outgoing side.

The light source 810 comprises a lamp 811 such as a metal halide lamp and a reflector 812 reflecting the light of the lamp. The blue light and green light reflex dichroic mirror 813 transmits the red light among the luminous fluxes from the light source 810, and at the same time, reflects the blue light and the green light. The transmitted red light is reflected by the reflection mirror 817, and is entered in the liquid crystal light modulator for red light 822.

On the other hand, green light among the color lights reflected by the dichroic mirror 813 is reflected by the green light reflex dichroic mirror 814, and is entered in the liquid crystal light modulator for green light 823. On the other hand, blue light is also transmitted by the second dichroic mirror 814. With respect to the blue light, in order to prevent optical loss due to a long optical path, a light introducing device comprising the incident lens 818, the relay lens 819, and the outgoing lens 820 is provided, and the blue light is entered in the liquid crystal light modulator for blue light 824 via the light introducing device.

Three color lights modulated by each of the light modulators enter in the cross dichroic prism 825. The prism is formed by joining four right angle prisms, and on the inner surface thereof, a dielectric multilayered film for reflecting red light and a dielectric multilayered film for reflecting blue light are formed in a cross form. By these dielectric multilayered films, three color lights are composed, thus forming a light indicating a color image. The composed light is projected on a screen 827 by the projection lens 826 which is a projection optical system, and an image is enlarged and is displayed.

Figure 13A:
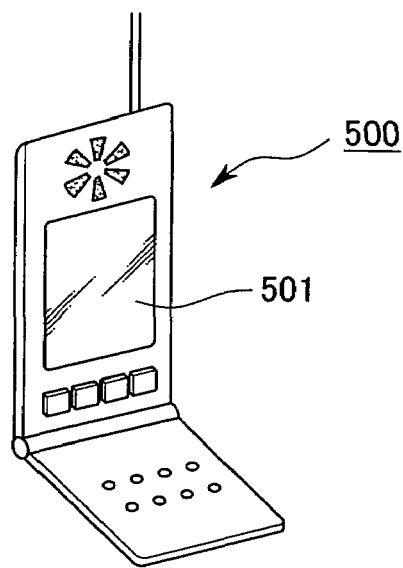
FIGS. 13A, 13B, and 13C are schematic views showing pieces of electronic equipment having any one of the transmission liquid crystal devices of the first to fourth embodiments according to the present invention.

In addition, FIG. 13A is a schematic view showing an example of a mobile phone. In FIG. 13A, reference numeral "500" indicates a body of a mobile phone, and reference numeral "501" indicates a liquid crystal display part equipped with any one of the liquid crystal devices according to the first to fourth embodiments described above.

Figure 13B:
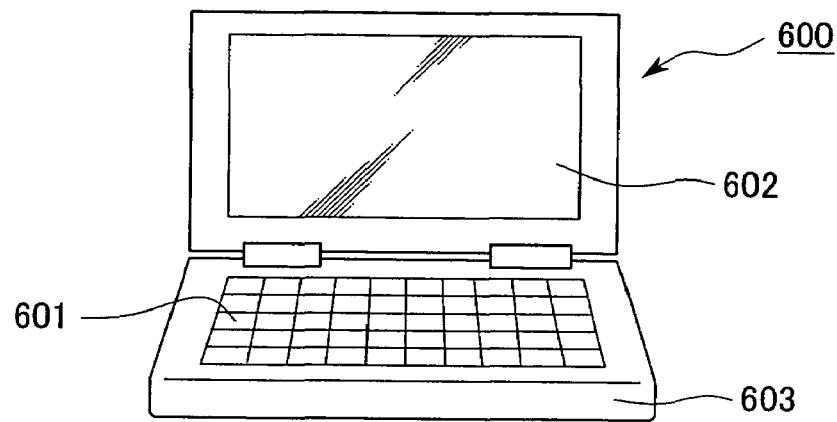

FIG. 13B is a schematic view showing an example of a portable information processor such as a word processor or a personal computer. In FIG. 13B, reference numeral "600" indicates an information processor, reference numeral "601" indicates an input section such as keyboard, reference numeral "603" indicates an information processing body, and reference numeral "602" indicates a liquid crystal display part equipped with any one of the liquid crystal devices according to the first to fourth embodiments described above.

Figure 13C:
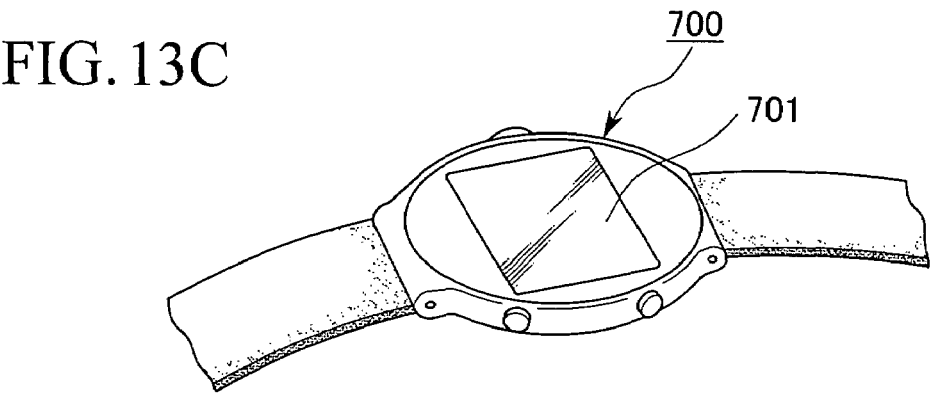

FIG. 13C is a schematic view showing an example of a wristwatch type piece of electronic equipment. In FIG. 13C, reference numeral "700" indicates a wristwatch body, and reference numeral "701" indicates a liquid crystal display part equipped with any one of the liquid crystal devices according to the first to fourth embodiments described above.

The electronic equipment shown in FIGS. 12, 13A, 13B, and 13C are provided with the liquid crystal devices of the embodiments described above. For this reason, the axial orientation in the horizontal direction of the liquid crystal can be enhanced, display quality can be improved, and reliability can be improved.

In addition, the technical scope of the present invention is not restricted to the embodiments described above, and various modifications thereto without departing from the essential spirit of the present invention can be made.

As described above, according to a liquid crystal device of the present invention, plural grooves are formed in parallel on the surface of the orientation film, and in these grooves, concave-convex portions for controlling the orientation direction of the liquid crystal layer are periodically formed along the direction in which the groove extends, and between the opening of the groove and each of the top parts of the concave-convex portions, a height difference is provided. Thereby, the area of the side face of the grooves can be ensured, and the axial orientation in the horizontal direction of the liquid crystal can be enhanced. Therefore, display quality can be improved, and reliability can be improved.

According to another liquid crystal device of the present invention, plural projecting ridges are formed in parallel on the surface of the orientation film, in the projecting ridge, concave-convex portions for controlling the orientation direction of the liquid crystal layer are periodically formed along the direction in which the projecting ridge extends, and between the bottom part of the projecting ridge and each of the bottom parts of the concave-convex portions, a height difference is provided. For these reasons, the area of the side face of the projecting ridge can be ensured, and the axial orientation in the horizontal direction of the liquid crystal can be enhanced. Therefore, display quality can be improved, and reliability can be improved.

In addition, according to the electronic equipment of the present invention, liquid crystal devices of the present invention are provided therein, and the axial orientation in the horizontal direction of the liquid crystal can be enhanced. Therefore, the electronic equipment having improved display quality and reliability can be provided.

What is claimed is:

1. A liquid crystal device comprising:
a pair of substrates which are arranged to face each other;
a liquid crystal layer interposed between said pair of substrates;
an electrode for applying a voltage to the liquid crystal layer, which is provided on a surface, directed to said liquid crystal layer, of each of said pair of substrates; and
an orientation film for orienting liquid crystal molecules of said liquid crystal layer, which is formed on a surface, directed to said liquid crystal layer, of each of said electrodes,
wherein on a surface of said orientation film, plural grooves are respectively formed in parallel; wherein each of the grooves is separated from an adjacent groove by a stripe-shaped projecting ridge, each stripe-shaped projecting ridge having a substantially flat planar upper surface; wherein in each of the grooves, concave-convex portions for controlling an orientation direction of said liquid crystal layer are periodically formed along a direction in which said grooves extend; and wherein the substantially flat planar upper surface of each projecting ridge projects higher than top parts of the concave-convex portions of the grooves.

2. The liquid crystal device according to claim 1, wherein a height difference between the substantially flat planar upper surface of each projecting ridge and the top parts of the concave-convex portions of the grooves ranges from 30 nm to 500 nm.

3. The liquid crystal device according to claim 1, wherein said electrode formed in the groove is maintained in contact with said electrode formed in the projecting ridge.

4. The liquid crystal device according to claim 1, wherein said electrode has a thickness which is greater than or the same as a height difference between the substantially flat planar upper surface of each projecting ridge and the top parts of the concave-convex portions of the grooves.

5. The liquid crystal device according to claim 1, wherein said concave-convex portions have a cross-sectional form, along said direction in which said concave-convex portions extend, of a general triangular form.

6. The liquid crystal device according to claim 1, wherein on a surface of said substrate, concave-convex portions corresponding to said concave-convex portions are also formed.

7. A piece of electronic equipment comprising the liquid crystal device according to claim 1.

8. The liquid crystal device according to claim 1, wherein the substantially flat planar upper surface of each stripe-shaped projecting ridge is substantially parallel with each apex and base of the concave-convex portions of the grooves.

9. A liquid crystal device comprising:
a pair of substrates which are arranged to face each other;
a liquid crystal layer interposed between the pair of substrates;
an electrode for applying a voltage to said liquid crystal layer, which is provided on a surface, directed to said liquid crystal layer, of each of said pair of substrates; and
an orientation film for orienting liquid crystal molecules of said liquid crystal layer, which is formed on a surface, directed to said liquid crystal layer, of each of said electrodes,
wherein a surface of said orientation film includes plural projecting ridges formed in parallel and plural stripe-shaped sections, wherein each of the projecting ridges is separated from an adjacent projecting ridge by one of the stripe-shaped sections, each of the stripe-shaped sections having a substantially flat planar surface; wherein in each of the projecting ridges, concave-convex portions for controlling an orientation direction of said liquid crystal layer are periodically formed along a direction in which said projecting ridges extend; and wherein the substantially flat planar surface of each stripe-shape section is lower than each of bottom parts of said concave-convex portions of the projecting ridges.

10. The liquid crystal device according to claim 9, wherein the substantially flat planar surface of each stripe-shaped section is substantially parallel with each apex and base of the concave-convex portions of the projecting ridges.

11. A liquid crystal device comprising:
a pair of substrates which are arranged to face each other;
a liquid crystal layer interposed between said pair of substrates; and
an electrode for applying a voltage to the liquid crystal layer, which is provided on a surface, directed to said liquid crystal layer, of each of said pair of substrates,
wherein said electrode is exposed to said liquid crystal layer, and on a surface of said electrode, plural grooves are respectively formed in parallel; wherein each of the grooves is separated from an adjacent groove by a stripe-shaped projecting ridge, each stripe-shaped projecting ridge having a substantially flat planar upper surface; wherein in each of the grooves, concave-convex portions for controlling an orientation direction of said liquid crystal layer are periodically formed along a direction in which said grooves extend; and wherein the substantially flat planar upper surface of each projecting ridge projects higher than top parts of the concave-convex portions of the grooves.

12. The liquid crystal device according to claim 11, wherein the substantially flat planar upper surface of each stripe-shaped projecting ridge is substantially parallel with each apex and base of the concave-convex portions of the grooves.

13. A liquid crystal device comprising:
a pair of substrates which are arranged to face each other;
a liquid crystal layer interposed between the pair of substrates; and
an electrode for applying a voltage to said liquid crystal layer, which is provided on a surface, directed to said liquid crystal layer, of each of said pair of substrates,
wherein said electrode is exposed to said liquid crystal layer, and wherein a surface of said electrode includes plural projecting ridges formed in parallel and plural stripe-shaped sections, wherein each of the projecting ridges is separated from an adjacent projecting ridge by one of the stripe-shaped sections, each of the stripe-shaped sections having a substantially flat planar surface; wherein in each of the projecting ridges, concave-convex portions for controlling an orientation direction of said liquid crystal layer are periodically formed along a direction in which said projecting ridges extend; and wherein the substantially flat planar a-surface of each stripe-shaped section is lower than each of bottom parts of said concave-convex portions of the projecting ridges.

14. The liquid crystal device according to claim 13, wherein the substantially flat planar surface of each stripe-shaped section is substantially parallel with each apex and base of the concave-convex portions of the projecting ridges.

* * * * *